United States Patent
Jung et al.

(10) Patent No.: US 10,433,281 B2
(45) Date of Patent: Oct. 1, 2019

(54) D2D OPERATION METHOD PERFORMED BY TERMINAL IN WIRELESS COMMUNICATION SYSTEM, AND TERMINAL USING SAME

(71) Applicant: LG ELECTRONICS INC., Seoul (KR)

(72) Inventors: Sunghoon Jung, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 70 days.

(21) Appl. No.: 15/307,755

(22) PCT Filed: Apr. 30, 2015

(86) PCT No.: PCT/KR2015/004440
§ 371 (c)(1),
(2) Date: Oct. 28, 2016

(87) PCT Pub. No.: WO2015/167304
PCT Pub. Date: Nov. 5, 2015

(65) Prior Publication Data
US 2017/0118741 A1    Apr. 27, 2017

Related U.S. Application Data

(60) Provisional application No. 61/986,899, filed on May 1, 2014, provisional application No. 61/986,900, filed on May 1, 2014.

(51) Int. Cl.
*H04W 4/00* (2018.01)
*H04W 72/02* (2009.01)
(Continued)

(52) U.S. Cl.
CPC .......... *H04W 72/02* (2013.01); *H04W 8/005* (2013.01); *H04W 24/10* (2013.01); *H04W 48/16* (2013.01); *H04W 72/042* (2013.01); *H04W 76/14* (2018.02)

(58) Field of Classification Search
CPC ..... H04W 24/10; H04W 48/16; H04W 72/02; H04W 72/042; H04W 76/023; H04W 76/14; H04W 8/005
See application file for complete search history.

(56) References Cited

U.S. PATENT DOCUMENTS

2009/0209260 A1  8/2009 Lee et al.
2013/0109301 A1  5/2013 Hakola et al.
(Continued)

FOREIGN PATENT DOCUMENTS

CN    103327568    9/2013
CN    103428679    12/2013

OTHER PUBLICATIONS

Institute for Information Industry (III), "Integrated resource scheduling for in-coverage D2D communication to support Mode 1 and Mode 2", 3GPP TSG RAN WG1 Meeting #76bis, R1-141499, Mar. 21, 2014, 6 pages.

(Continued)

*Primary Examiner* — Abdelillah Elmejjarmi
(74) *Attorney, Agent, or Firm* — Lee Hong Degerman Kang Waimey

(57) ABSTRACT

Provided is a D2D operation method performed by a terminal in a wireless communication system, and a terminal using same. In the method, received is indication information indicating whether or not using preconfigured D2D resources within cell coverage is permitted, resources for D2D signal transmission are determined on the basis of the (Continued)

indication information, and a D2D signal is transmitted by using the determined resources.

4 Claims, 19 Drawing Sheets

(51) Int. Cl.
*H04W 76/14* (2018.01)
*H04W 24/10* (2009.01)
*H04W 72/04* (2009.01)
*H04W 8/00* (2009.01)
*H04W 48/16* (2009.01)

(56) References Cited

U.S. PATENT DOCUMENTS

| | | | | |
|---|---|---|---|---|
| 2015/0271861 A1* | 9/2015 | Li | .................. | H04W 56/001 455/426.1 |
| 2015/0296407 A1* | 10/2015 | Guo | .................. | H04W 72/1284 370/230 |
| 2015/0351020 A1* | 12/2015 | Lin | .................. | H04W 8/005 455/404.1 |
| 2016/0255515 A1* | 9/2016 | Lindoff | .................. | H04W 76/14 370/252 |
| 2016/0255668 A1* | 9/2016 | Wei | .................. | H04W 8/005 455/434 |
| 2016/0374135 A1* | 12/2016 | Martin | .................. | H04W 72/04 |
| 2017/0353848 A1* | 12/2017 | He | .................. | H04W 72/02 |
| 2018/0213521 A1* | 7/2018 | Martin | .................. | H04W 72/048 |

OTHER PUBLICATIONS

Intel Corporation, "Discussion on Out of Coverage Definition", 3GPP TSG RAN WG1 Meeting #76bis, R1-141547, Mar. 22, 2014, 3 pages.
LG Electronics, "Definition of coverage in D2D operation perspective", 3GPP TSG RAN WG1 Meeting #76bis, R1-141355, Mar. 22, 2014, 3 pages.
Samsung, "Definitions of in-coverage, out-of-coverage, edge-of-cell coverage", 3GPP TSG RAN WG1 Meeting #76bis, R1-141309, Mar. 22, 2014, 3 pages.
ZTE, "Discussion on Definitions of Coverage Scenarios", 3GPP TSG-RAN WG1 Meeting #76bis, R1-141428, Mar. 22, 2014, 2 pages.
3rd Generation Partnership Project, "Technical Specification Group Radio Access Network; Evolved Universal Terrestrial Radio Access (E-UTRA); User Equipment (UE) procedures in idle mode (Release 8)", 3GPP TS 36.304 V8.5.0, Mar. 2009, 30 pages.
PCT International Application No. PCT/KR2015/004440, International Search Report dated Jul. 29, 2015, 2 page.
The State Intellectual Property Office of the People's Republic of China Application No. 201580021911.5, Office Action dated Dec. 5, 2018, 5 pages.

* cited by examiner

D2D OPERATION METHOD PERFORMED BY TERMINAL IN WIRELESS COMMUNICATION SYSTEM, AND TERMINAL USING SAME

CROSS-REFERENCE TO RELATED APPLICATIONS

This application is the National Stage filing under 35 U.S.C. 371 of International Application No. PCT/KR2015/004440, filed on Apr. 30, 2015, which claims the benefit of U.S. Provisional Application No. 61/986,899, filed on May 1, 2014 and 61/986,900, filed on May 1, 2014, the contents of which are all hereby incorporated by reference herein in their entirety.

BACKGROUND OF THE INVENTION

Field of the Invention

The present invention relates to wireless communications, and more particularly, to a device-to-device (D2D) operation method performed by a terminal in a wireless communication system and a terminal using the method.

Related Art

In an International Telecommunication Union Radio communication sector (ITU-R), a standardization of International Mobile Telecommunication (IMT)-Advanced being a next mobile communication system after a third generation has been performed. The IMT-Advanced is aimed at supporting an Internet Protocol (IP) based multi-media service with a data transmission rate of 1 Gbps in a stop and low speed moving state and a data transmission rate of 1 Gbps in a high speed moving state.

A 3rd Generation Partnership Project (3GPP) is preparing LTE-Advanced (LTE-A) being an improved one of Long Term Evolution (LTE) based on an OFDMA (Orthogonal Frequency Division Multiple Access)/SC-FDMA (Single Carrier-Frequency Division Multiple Access) transmission scheme as a system standard satisfying requirements of IMT-Advanced. The LTE-A is one important candidate for IMT-Advanced.

In recent years, there is growing interest in a Device-to-Device (D2D) technology performing direct communication between devices. In particular, the D2D is attracting attention as a communication technology for a public safety network. A commercial communication network has been rapidly changed to the LTE but a current public safety network is based on a 2G technology in a collision problem and a cost side with an existing communication standard. Request for the technology clearance and an improved service induces an effort to improve the public safety network.

The public safety network has high service requirements (reliability and security) as compared with a commercial communication network. In particular, when coverage of cellular communication is insufficient or is not used, there is a need for direct signal transmission/reception between devices, that is, a D2D operation.

The D2D operation may be signal transmission/reception between adjacent devices to have various advantages. For example, a D2D terminal may perform data communication with a high transmission rate and low delay. Further, the D2D operation may distribute traffic converged in a base station. If the D2D terminal serves as a relay, the D2D terminal may serve to extend coverage of a base station.

Meanwhile, a terminal is required to perform a D2D operation with another terminal even when being located side cell coverage, because the D2D operation is mainly for public safety/disastrous situations. To this end, the terminal may be assigned a resource for a D2D operation in advance. Such a resource is referred to as a preconfigured resource. The terminal may perform D2D transmission in mode 2 using the preconfigured resource.

Mode 2 refers to a mode in which a terminal autonomously selects a specific resource in a defined resource pool and transmits a D2D signal through the selected resource. In mode-2 D2D signal transmission, a terminal may select a specific resource among the predetermined resources or may select a specific resource in a resource pool configured by a network. On the contrary, mode 1 refers to a mode in which a D2D signal is transmitted using a resource scheduled by a network.

Meanwhile, when a terminal, which is located outside cell coverage, enters the cell coverage, the terminal may acquire a mode-2 transmission resource from system information provided by a base station of a cell. However, if the system information simply indicates the mode-2 transmission resource only, the terminal may not know whether the mode-2 transmission resource is applied in a radio resource control (RRC) idle state or is applied only in an RRC connected state.

Further, although the network does not configure or reports the mode-2 transmission resource to the terminal, the network may need to control whether to allow the terminal to use the preconfigured resource in the cell coverage.

SUMMARY OF THE INVENTION

Accordingly, an object of the present invention is to a device-to-device (D2D) operation method performed by a terminal in a wireless communication system and a terminal using the same.

In an aspect, a method for a device-to-device (D2D) operation performed by a user equipment (UE) in a wireless communication system is provided. The method comprises receiving an indicator that indicates whether using a preconfigured D2D resource in cell coverage is allowed, determining a resource for D2D signal transmission based on the indicator and transmitting a D2D signal using the determined resource.

The preconfigured D2D resource may be a D2D resource used outside the cell coverage.

The indicator may be received through system information.

The indicator may further indicate a radio resource control (RRC) state of the UE in which the UE is allowed to use the preconfigured D2D resource.

The RRC state of the UE may be at least one of an RRC idle (RRC_Idle) state and an RRC connected (RRC_Connected) state.

The method may further comprises receiving a reference signal received power (RSRP) threshold value.

The resource for D2D signal transmission may be determined based on the RSRP threshold value and the indicator.

In another aspect, a user equipment (UE) is provided. The UE comprises a radio frequency (RF) unit that transmits and receives a radio signal and a processor connected to the RF unit to operate, wherein the processor that receives an indicator that indicates whether using a preconfigured D2D resource in cell coverage is allowed, determines a resource for device to device (D2D) signal transmission based on the indicator, and transmits a D2D signal using the determined resource.

According to the present invention, a terminal may clearly know an RRC state in which a mode-2 resource indicated by a network is applied. Further, the terminal may clearly know whether a preconfigured resource can be used in cell coverage and when the preconfigured resource can be used. Therefore, the reliability of a D2D operation may be increased and interference in a cell may be minimized.

DESCRIPTION OF EXEMPLARY EMBODIMENTS

Figure 1:
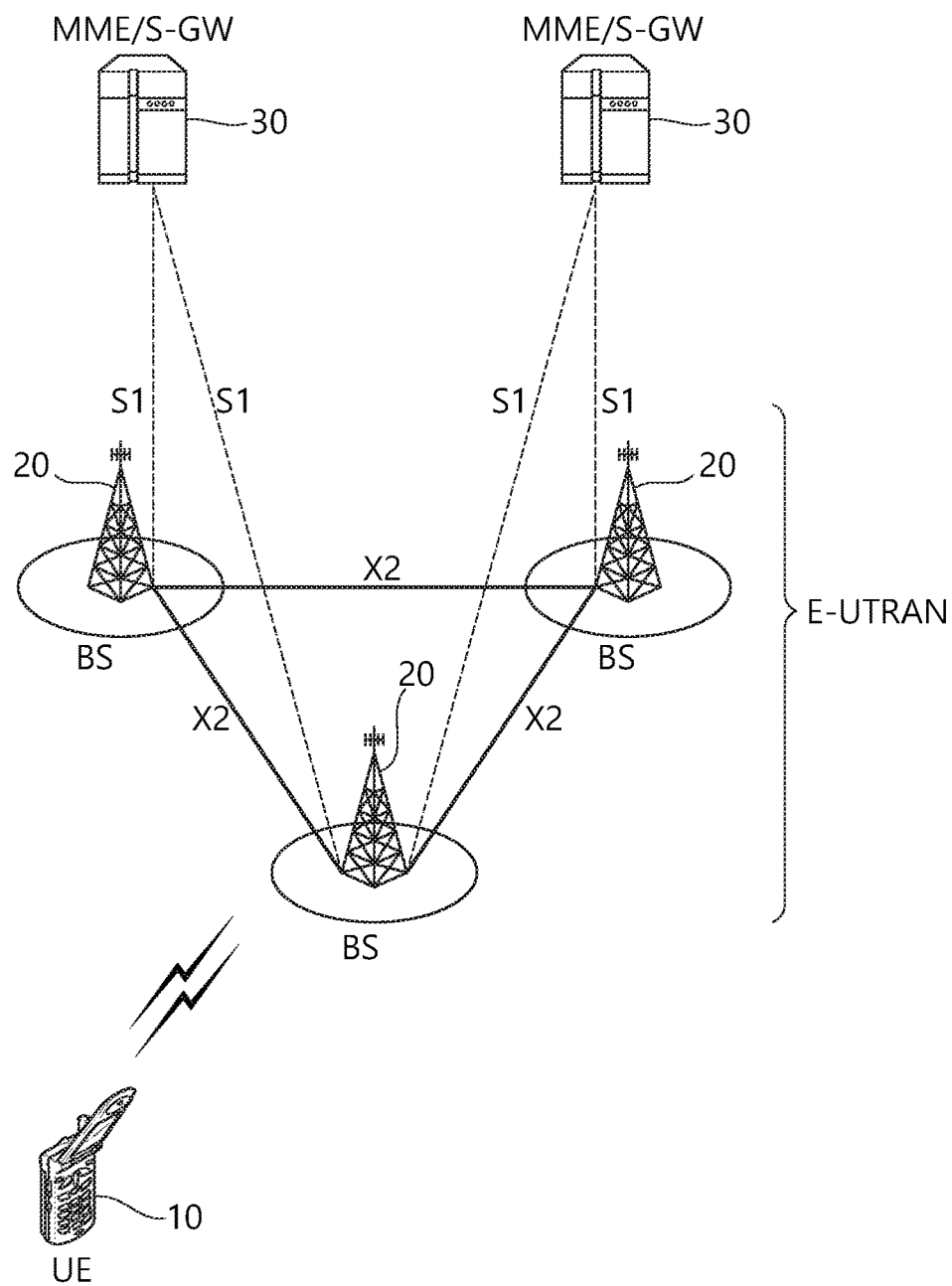
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
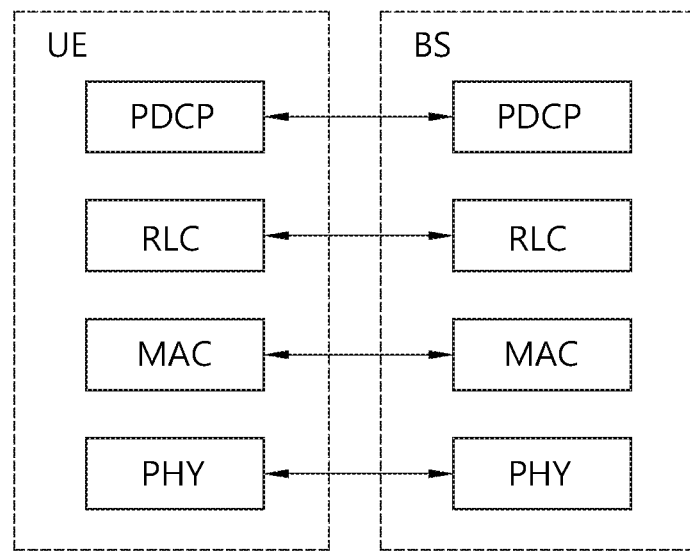
FIG. 2 is a diagram showing a wireless protocol architecture for a user plane.
Figure 3:
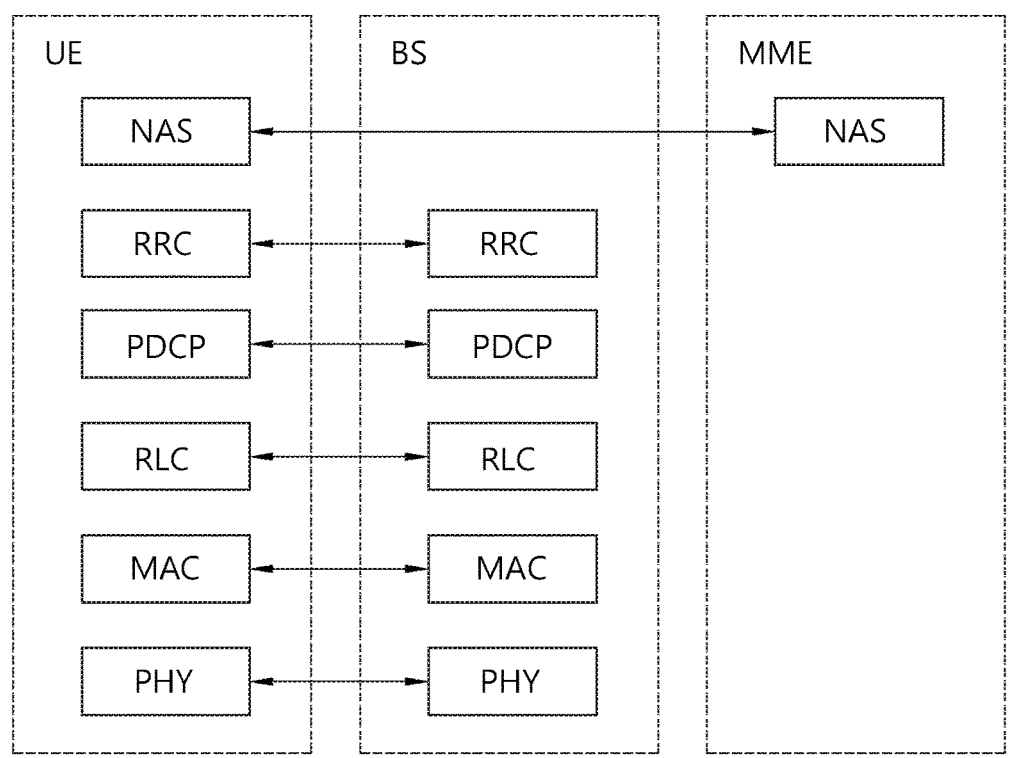
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a procedure of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBs).

The MIB may include a limited number of parameters that are most essential and most frequently transmitted when other information is required to be obtained from a cell. UE first searches for an MIB after downlink synchronization. The MIB may include information, such as an SFN that supports downlink channel bandwidth, a PHICH configuration, and synchronization and operates as a timing criterion and an eNB transmit antenna configuration. The MIB may be transmitted on a broadcast channel (BCH) through broadcasting.

SystemInformationBlockType1 (SIB1) of included SIBs is included in a "SystemInformationBlockType1" message and transmitted. The remaining SIBs other than the SIB1 is included in a system information message and transmitted. To map the SIBs to the system information message may be flexibly configured by a scheduling information list parameter included in the SIB1. In this case, each of the SIBs is included in a single system information message, and only SIBs having the same scheduling requirement value (e.g. cycle) may be mapped to the same system information message. Furthermore, a SystemInformationBlockType2 (SIB2) is always mapped to a system information message corresponding to the first entry within the system information message list of a scheduling information list. A plurality of system information messages may be transmitted within the same cycle. The SIB1 and all the system information messages are transmitted on a DL-SCH.

In addition to broadcast transmission, in an E-UTRAN, the SIB1 may be dedicated-signaled in the state in which it includes a parameter configured like an existing configured value. In this case, the SIB1 may be included in an RRC connection reconfiguration message and transmitted.

The SIB1 includes information related to UE cell access, and defines the scheduling of other SIBs. The SIB1 may include information related to the PLMN identifiers of a network, tracking area code (TAC) and a cell ID, a cell barring status indicative of whether a cell is a cell on which camp-on is possible, the lowest reception level required within a cell which is used as cell reselection criterion, and the transmission time and cycle of other SIBs.

The SIB2 may include radio resource configuration information common to all pieces of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and detecting a change of system information to a primary cell (PCell) only. In a secondary cell (SCell), when a corresponding SCell is added, an E-UTRAN may provide all of pieces of system information related to an RRC connection state operation through dedicated signaling. When system information related to a configured SCell is changed, an E-UTRAN may release an SCell that is taken into consideration and subsequently add the changed system information. This may be performed along with a single RRC connection reconfiguration message. An E-UTRAN may configure parameter values different from a value broadcasted within an SCell that has been taken into consideration through dedicated signaling.

UE needs to guarantee the validity of a specific type of system information, and such system information is called required system information. The required system information may be defined as follows.

If UE is an RRC idle state: The UE needs to be guaranteed so that it has the valid versions of the MIB and the SIB1 in addition to the SIB2 to SIB8. This may comply with the support of a radio access technology (RAT) that is taken into consideration.

If UE is an RRC connection state: The UE needs to be guaranteed so that it has the valid versions of the MIB, the SIB1, and the SIB2.

In general, the validity of system information may be guaranteed up to a maximum of 3 hours after the system information is obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
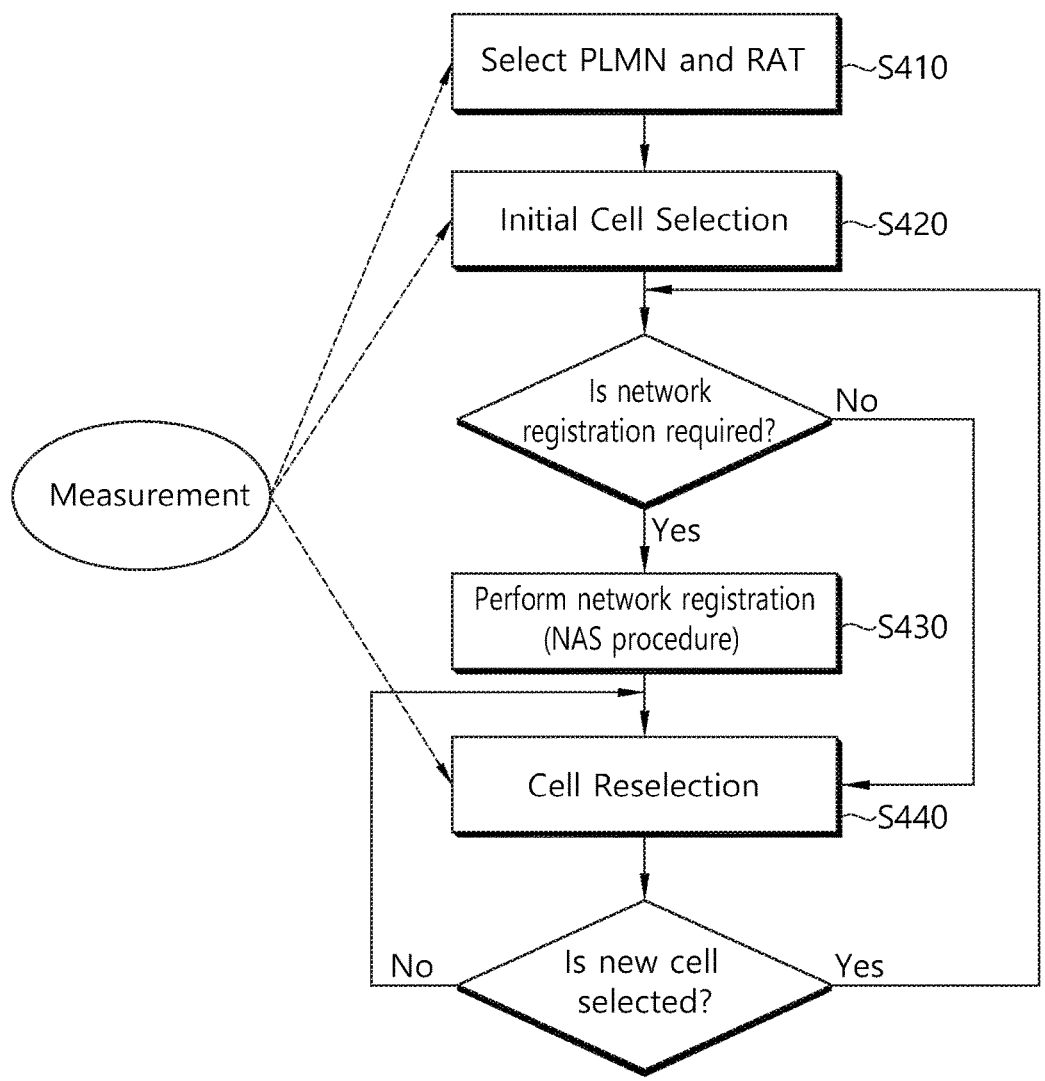
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection procedure, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This procedure is called cell reselection differently from the initial cell selection of the No. 2 procedure. In this case, temporal restriction conditions are placed in order for a cell to be frequently reselected in response to a change of signal characteristic. A cell reselection procedure is described later in detail.

Figure 5:
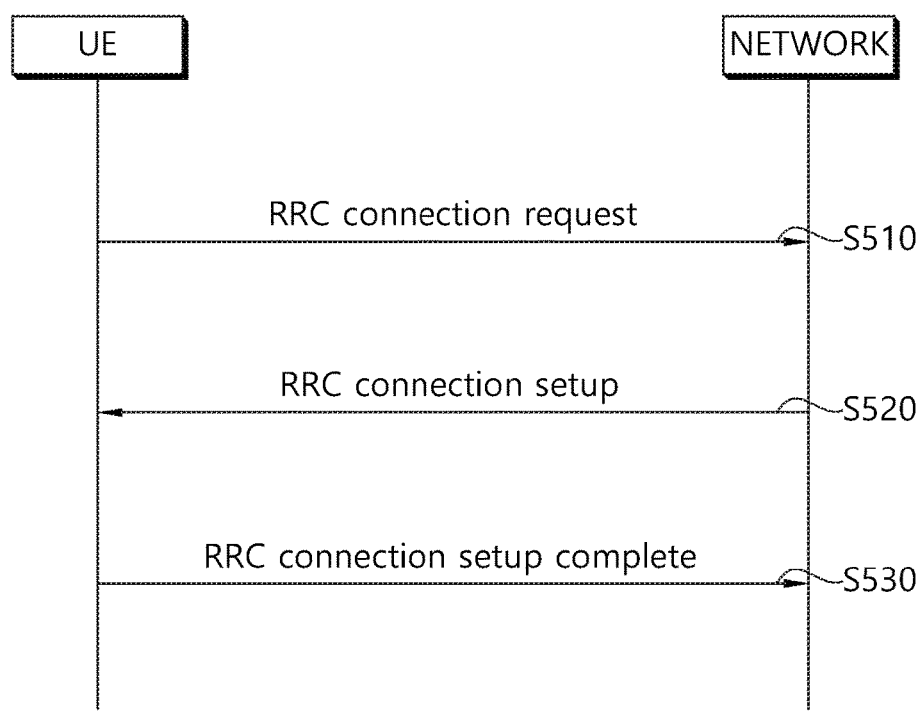
FIG. 5 is a flowchart illustrating a procedure of establishing RRC connection.

FIG. 5 is a flowchart illustrating a procedure of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
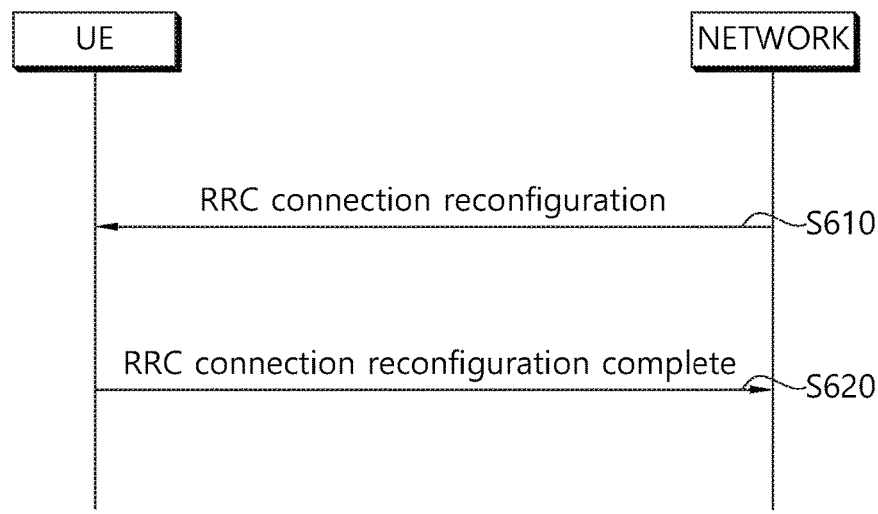
FIG. 6 is a flowchart illustrating an RRC connection reconfiguration procedure.

FIG. 6 is a flowchart illustrating an RRC connection reconfiguration procedure. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009-03) "User Equipment (UE) procedures in idle mode (Release 8)".

A cell selection procedure is basically divided into two types.

The first is an initial cell selection procedure. In this procedure, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection procedure. If the UE has only to search for a cell that satisfies the cell selection criterion, the UE selects the corresponding cell. If a suitable cell that satisfies the cell selection criterion is not retrieved though such a procedure, the UE performs an initial cell selection procedure.

A cell selection criterion may be defined as in Equation 1 below.

$$\text{Srxlev} > 0 \text{ AND } \text{Squal} > 0,\quad\quad\text{[Equation 1]}$$

where:

$$\text{Srxlev} = Q_{rxlevmeas} - (Q_{rxlevmin} + Q_{rxlevminoffset}) - P_{compensation},$$

$$\text{Squal} = Q_{qualmeas} - (Q_{qualmin} + Q_{qualminoffset})$$

In this case, in Equation 1, the variables may be defined as in Table 1 below.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | $\max(P_{EMAX} - P_{PowerClass}, 0)$ (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

Qrxlevminoffset and Qqualminoffset, that is, signaled values, are the results of periodic discovery for a PLMN having higher priority while UE camps on a normal cell within a VPLMN, and may be applied only when cell selection is evaluated. As described above, during the periodic discovery of a PLMN having higher priority, UE may perform cell selection evaluation using parameter values stored from another cell of the PLMN having such higher priority.

After UE selects any cell through a cell selection procedure, the intensity or quality of a signal between the UE and a BS may be changed due to the mobility of the UE or a change of a radio environment. Accordingly, if the quality of the selected cell is changed, the UE may select another cell providing better quality.

After the UE selects a specific cell through the cell selection procedure, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a procedure is called cell reselection. In general, a basic object of the cell reselection procedure is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection procedure compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection procedure is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency. For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection. For the intra-frequency or inter-frequency cell reselection, a network may provide UE with a cell reselection black list used in cell reselection.

The UE does not perform cell reselection on a cell included in the black list.

Ranking performed in a cell reselection evaluation procedure is described below.

A ranking criterion used to give the priority of a cell is defined as in Equation 2.

$$R_s = Q_{meas,s} + Q_{hyst}, \quad R_n = Q_{meas,n} - Q_{offset} \quad \text{[Equation 2]}$$

In Equation 2, Rs is the ranking criterion of a serving cell on which UE now camps, Rn is the ranking criterion of a neighboring cell, Qmeas,s is the quality value of the serving cell measured by the UE, Qmeas,n is the quality value of the neighboring cell measured by the UE, Qhyst is a hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

Hereinafter, radio link failure (RLF) will be described.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 7:
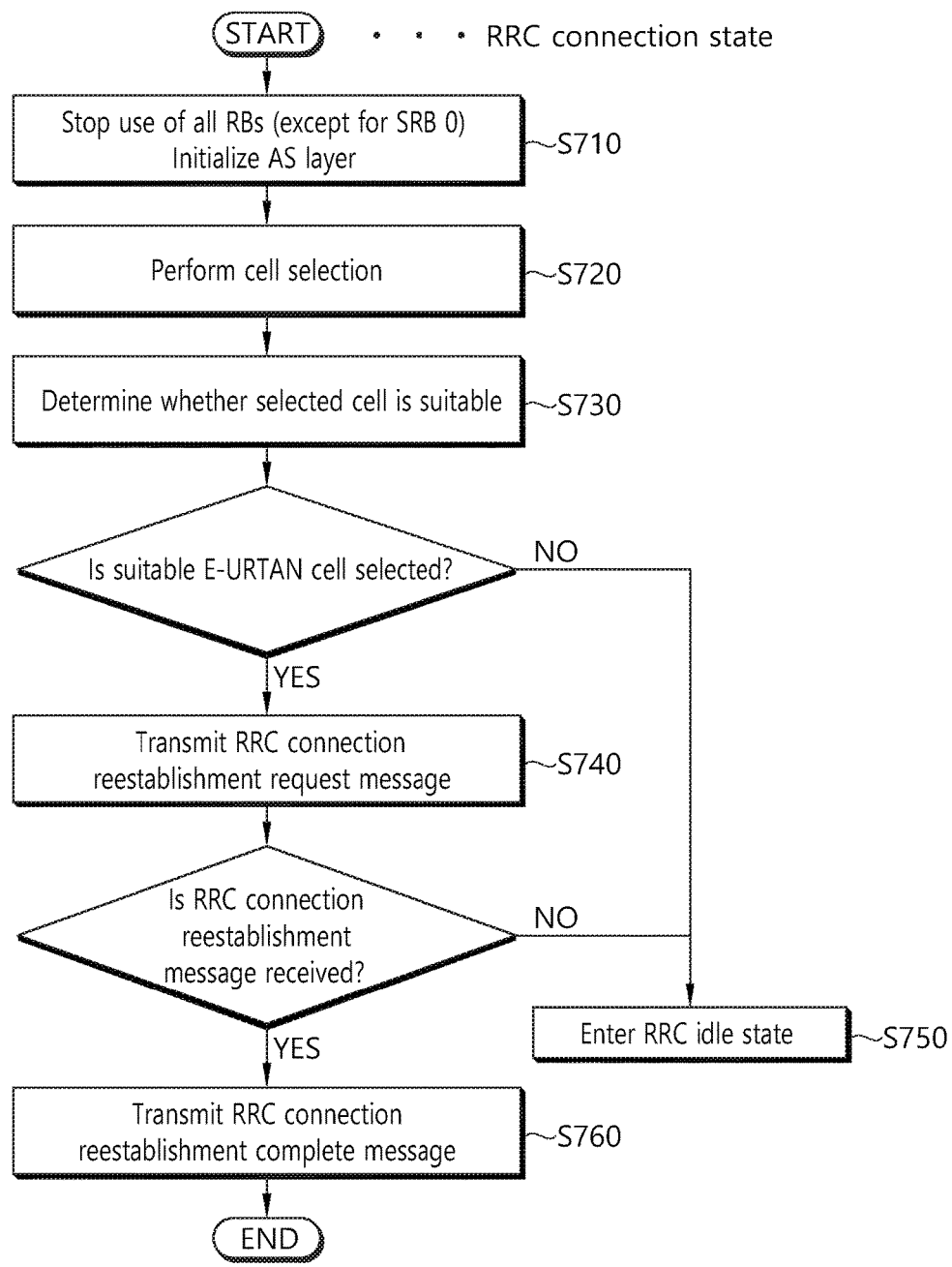
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this procedure, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 8:
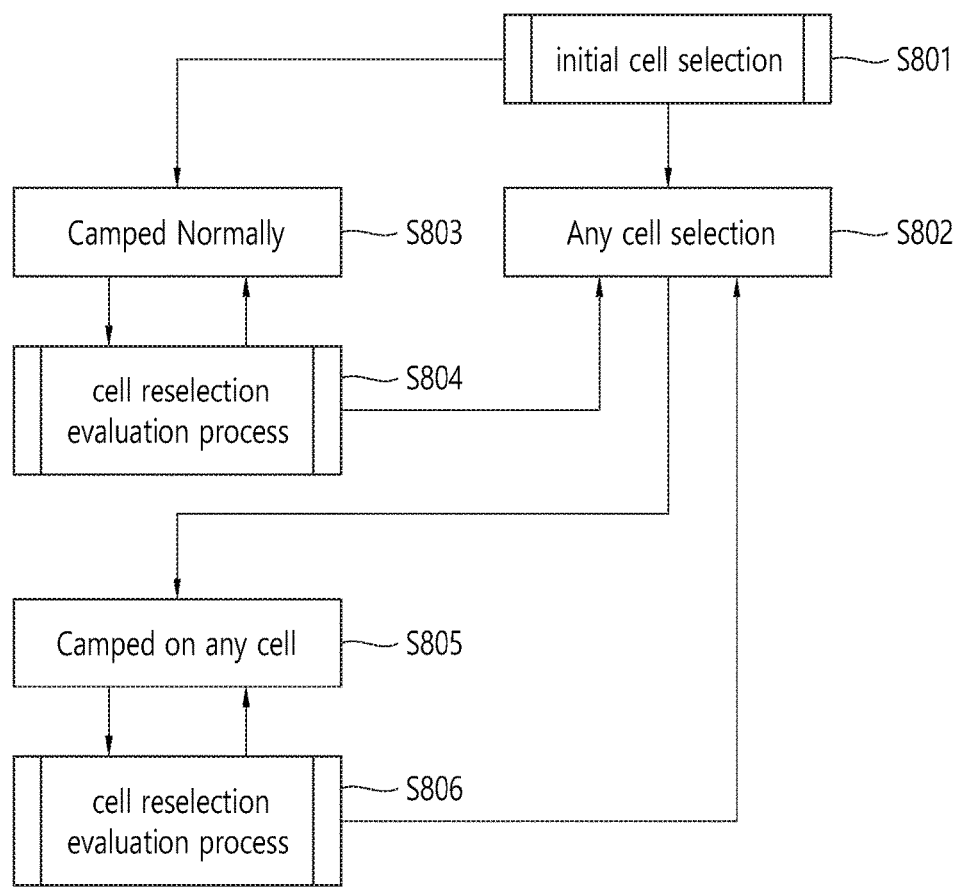
FIG. 8 illustrates sub states where the terminal may have in an RRC_IDLE state and a sub state transition process.

FIG. 8 illustrates sub states where the terminal may have in an RRC_IDLE state and a sub state transition process.

Referring to FIG. 8, a terminal performs an initial cell selection process (S801). The initial cell selection process may be performed when there is no stored cell information with respect to the PLMN or a suitable cell is not found.

If the suitable cell is not found in the initial cell selection process, the terminal transitions to an any cell selection state (S802). The optional cell selection state represents a state which does not camp on in both of a suitable cell and an acceptable cell. The optional cell selection state is a state attempted by the terminal in order to find an acceptable cell of an optional PLMN which may camp on. When the terminal finds no cells which may camp on, the terminal is continuously maintained in an optional cell selection state until the acceptable cell is found.

If the suitable cell is found in the initial cell selection process, the state transits to a normal camp state (S803). The normal camp state represents a state which camps on the normal cell. A paging channel is selected according to information given through system information to motor, and an evaluation process for cell reselection may be performed.

In the normal camp state (S803), if a cell reselection evaluation process (S804) is caused, the cell reselection evaluation process (S804) is performed. If a suitable cell is found in the cell reselection evaluation process (S804), the terminal again transits to the normal camp state (S803).

If an acceptable cell is found in the any cell selection state (S802), the terminal transits to an any cell camped state (S805). The any cell camped state (S805) represents a state of camping on an acceptable cell.

In the any cell camped state (S805), the terminal may select a paging channel according to information given through system information to monitor, and may perform a cell reselection evaluation process (S806). If the acceptable cell is not found in the cell reselection evaluation process (S806), the terminal transits the any cell selection state (S802).

Hereinafter, a D2D operation will be described. In the 3GPP LTE-A, a service related to the D2D operation refers to Proximity based Services (ProSe). Hereinafter, the ProSe is an equivalent concept with the D2D operation and the ProSe may be compatibly used with the D2D operation. The ProSe is now described.

The ProSe includes ProSe direct communication and ProSe direct discovery. The ProSe direct communication presents communication performed by two or more adjacent terminals. The terminals may perform communication using a protocol of a user plane. A ProSe-enabled UE means a UE for supporting a process related to requirements of the ProSe. Unless otherwise defined, the ProSe-enabled UE includes both of a public safety UE and a non-public safety UE. The public safety UE represents a UE for supporting both of a public safety specified function and the ProSe process. The non-public safety UE is a terminal which supports the ProSe process but does not support the public safety specified function.

The ProSe direct discovery is a process where the ProSe-enabled UE discovers another ProSe-enabled UE. In this case, only ability of the two ProSe-enabled UEs is used. An EPC-level ProSe discovery signifies a process where an EPC determines whether 2 ProSe enable terminals are closed to each other, and reports the close state thereof the two ProSe enabled terminals.

Hereinafter, the ProSe direct communication may refer to D2D communication, and the ProSe direct discovery may refer to D2D discovery.

Figure 9:
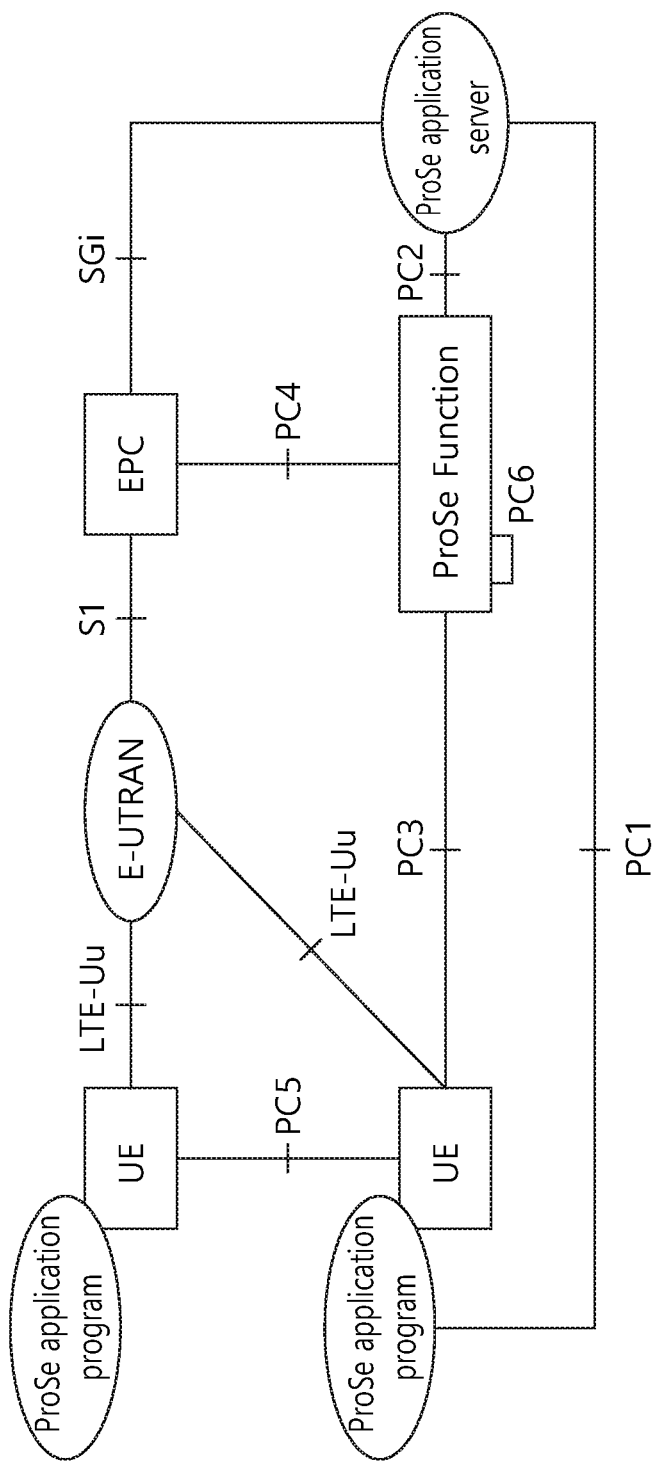
FIG. 9 illustrates a reference structure for a ProSe.

FIG. 9 illustrates a reference structure for a ProSe.

Referring to FIG. 9, the reference structure for a ProSe includes a plurality of terminals having E-UTRAN, EPC, and ProSe application program, a ProSe application (APP) server, and a ProSe function.

An EPC is a representative example of the E-UTRAN. The EPC may include an MME, an S-GW, a P-GW, a policy and charging rules function (PCRF), and a home subscriber server (HSS).

The ProSe application server is a user of ProSe in order to make an application function. The ProSe application server may communicate with an application program in the terminal. The application program in the terminal may use a ProSe ability to make an application function.

The ProSe function may include at least one of following functions but is not limited thereto.

Interworking via a reference point towards the 3rd party applications

Authorization and configuration of the UE for discovery and direct communication)

Enable the function of the EPC level ProSe discovery

ProSe related new subscriber data and handling of data storage, and also handling of ProSe identities Security related function Provide control towards the EPC for policy related function Provide function for charging (via or outside of EPC, e.g., offline charging))

Hereinafter, a reference point and a reference interface will be described in a reference structure for the ProSe.

PC1: a reference point between a ProSe application program in the terminal and a ProSe application program in a ProSe application server. The PC1 is used to define signaling requirements in an application level.

PC2: is a reference point between the ProSe application server and a ProSe function. The PC2 is used to define an interaction between the ProSe application server and a ProSe function. An application data update of a ProSe database of the ProSe function may be an example of the interaction.

PC3: is a reference point between the terminal and the ProSe function. The PC3 is used to define an interaction between the terminal and the ProSe function. Configuration for ProSe discovery and communication may be an example of the interaction.

PC4: is a reference point between an EPC and the ProSe function. The PC4 is used to define an interaction between the EPC and the ProSe function. The interaction lay illustrate when a path for 1:1 communication or a ProSe service for real time session management or mobility management are authorized.

PC5: is a reference point to use control/user plane for discovery, communication, and relay between terminals, and 1:1 communication.

PC6: is a reference point to use a function such as ProSe discovery between users included in different PLMNs.

SGi: may be used for application data and application level control information exchange.

<ProSe Direct Communication (D2D Communication)>.

The ProSe direct communication is a communication mode where two public safety terminals may perform direct communication through a PC 5 interface. The communication mode may be supported in both of a case of receiving a service in coverage of E-UTRAN or a case of separating the coverage of E-UTRAN.

Figure 10:
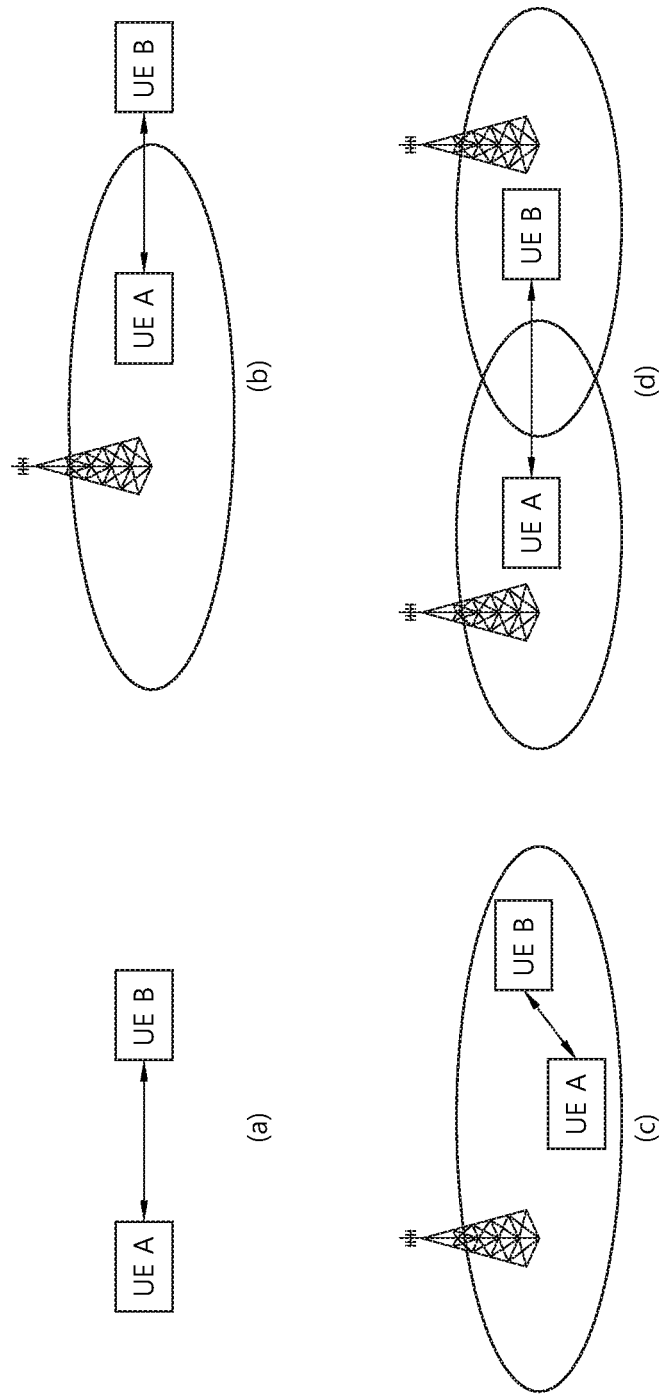
FIG. 10 illustrates arrangement examples of terminals performing ProSe direct communication and cell coverage.

FIG. 10 illustrates arrangement examples of terminals performing ProSe direct communication and cell coverage.

Referring to FIG. 10(a), UEs A and B may be located outside of the cell coverage. Referring to FIG. 10(b), the UE A may be located in the cell coverage and the UE B may be located outside of the cell coverage. Referring to FIG. 10(c), both of UEs A and B may be located in the cell coverage. Referring to FIG. 10(d), the UE A may be located in coverage of a first cell and the UE B may be in coverage of a second cell.

As described above, the ProSe direct communication may be performed between terminals which are provided at various positions.

Meanwhile, following IDs may be used in the ProSe direct communication.

Source layer-2 ID: The source layer-2 ID identifies a sender of a packet in a PC 5 interface.

Purpose layer-2 ID: The purpose layer-2 ID identifies a target of a packet in a PC 5 interface.

SA L1 ID: The SA L1 ID represents an in an ID in a scheduling assignment (SA) in the PC 5 interface.

Figure 11:
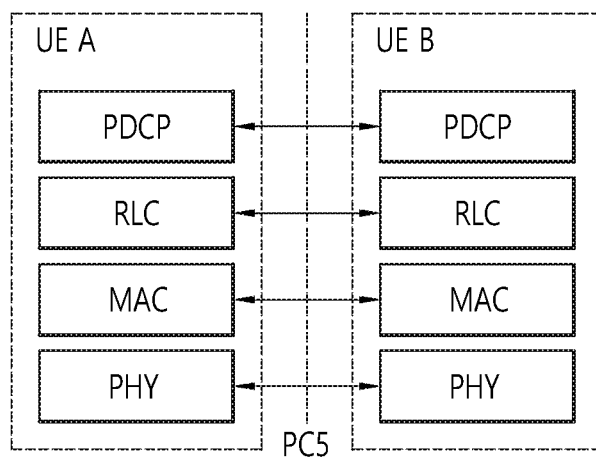
FIG. 11 illustrates a user plane protocol stack for the ProSe direct communication.

FIG. 11 illustrates a user plane protocol stack for the ProSe direct communication.

Referring to FIG. 11, the PC 5 interface includes a PDCH layer, a RLC layer, a MAC layer, and a PHY layer.

There may not be HARQ feedback in the ProSe direct communication. An MAC header may include the source layer-2 ID and the purpose layer-2 ID.

<Radio Resource Assignment for ProSe Direct Communication>.

A ProSe enable terminal may use following two modes with respect to resource assignments for the ProSe direct communication.

1. Mode 1

The mode 2 is a mode for receiving scheduling a resource for the ProSe direct communication from a base station. The terminal should be in a RRC_CONNECTED state according to the mode 1 in order to transmit data. The terminal requests a transmission resource to the base station, and the base station schedules a resource for scheduling assignment and data transmission. The terminal may transmit a scheduling request to the base station and may transmit a Buffer Status Report (ProSe BSR). The base station has data which the terminal will perform the ProSe direct communication and determines whether a resource for transmitting the data is required.

2. Mode 2

The mode 2 is a mode for selecting a direct resource. The terminal directly selects a resource for the ProSe direct communication from a resource pool. The resource pool may be configured by a network or may be previously determined.

Meanwhile, when the terminal includes a serving cell, that is, when the terminal is in an RRC_CONNECTED state with the base station or is located in a specific cell in an RRC_IDLE state, the terminal is regarded to be in coverage of the base station.

If the terminal is located outside of the coverage, only the mode 2 is applicable. If the terminal is located in the coverage, the mode 1 or the mode 2 may be used according to setting of the base station.

If there are no exceptional conditions, only when the base station is configured, the terminal may change a mode from the mode 1 to the mode 2 or from the mode 2 to the mode 1.

<ProSe Direct Discovery (D2D Discovery)>

The ProSe direct discovery represents a process used to discover when the ProSe enabled terminal discovers other neighboring ProSe enabled terminal and refers to D2D direction discovery or D2D discovery. In this case, an E-UTRA wireless signal through the PC 4 interface may be used. Hereinafter, information used for the ProSe direct discovery refers to discovery information.

Figure 12:
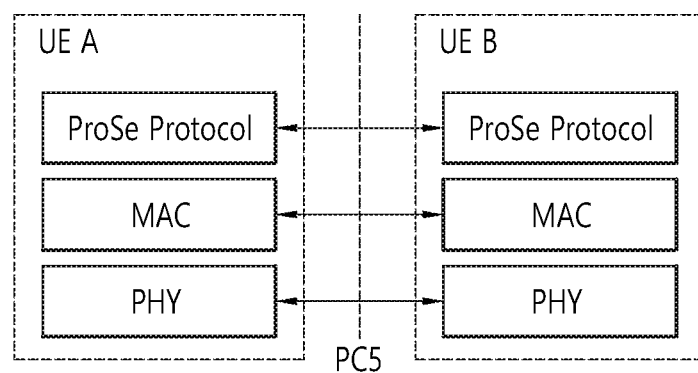
FIG. 12 illustrates a PC 5 interface for D2D discovery.

FIG. 12 illustrates a PC 5 interface for D2D discovery.

Referring to FIG. 12, the PC 5 interface includes an MAC layer, a PHY layer, and a ProSe Protocol layer being an upper layer. Permission for announcement and monitoring of discovery information is handled in the upper layer ProSe Protocol. Contents of discovery information are transparent to an access stratum (AS). The ProSe Protocol allows only valid discovery information to be transferred to the AS for announcement.

An MAC layer receives discovery information from the upper layer ProSe Protocol. An IP layer is not used for transmitting the discovery information. The MAC layer determines a resource used in order to announce the discovery information received from the upper layer. The MAC layer makes and sends a protocol data unit (MAC PDU) to a physical layer. An MAC header is not added.

There are two types of resource assignments for announcing the discovery information.

1. Type 1

The type 1 is a method assigned so that resources for announcing the discovery information are not terminal-specific and the base station provides resource pool configuration for announcing the discovery information to the terminals. The configuration may be included in a system information block (SIB) to be signaled in a broadcast scheme. Alternatively, the configuration may be included in a terminal specific RRC message to be provided. Alternatively, the configuration may be broadcast-signaled or terminal-specific signaled of a different layer from the RRC message.

The terminal selects a resource from an indicated resource pool to announce discovery information using the selected resource. The terminal may announce discovery information through a resource optionally selected during each discovery period.

2. Type 2

The type 2 is a method where resources for announcing the discovery information are terminal-specifically assigned. A terminal in a RRC_CONNECTED state may request a resource for announcing a discovery signal to the base station through a RRC signal. The base station may assign a resource for announcing a discovery signal as an RRC signal. A resource for monitoring the discovery signal in a configured resource pool may be assigned in terminals.

With respect to a terminal in an RRC_IDLE state, a base station may report a type 1 resource pool for announcing the discovery signal as an SIB. Terminals where ProSe direct discovery is allowed use a type 1 resource pool for announcing the discovery information in the RRC_IDLE state. Alternatively, the base station 2) reports that the base station supports the ProSe direct discovery through the SIB but may not provide the resource for announcing the discovery information. In this case, the terminal should enter the RRC_CONNECTED state for announcing the discovery information.

With respect to a terminal in an RRC_CONNECTED state, the base station may configure whether to use a type 1 resource pool or a type 2 resource pool for announcing the discovery information through a RRC signal.

Figure 13:
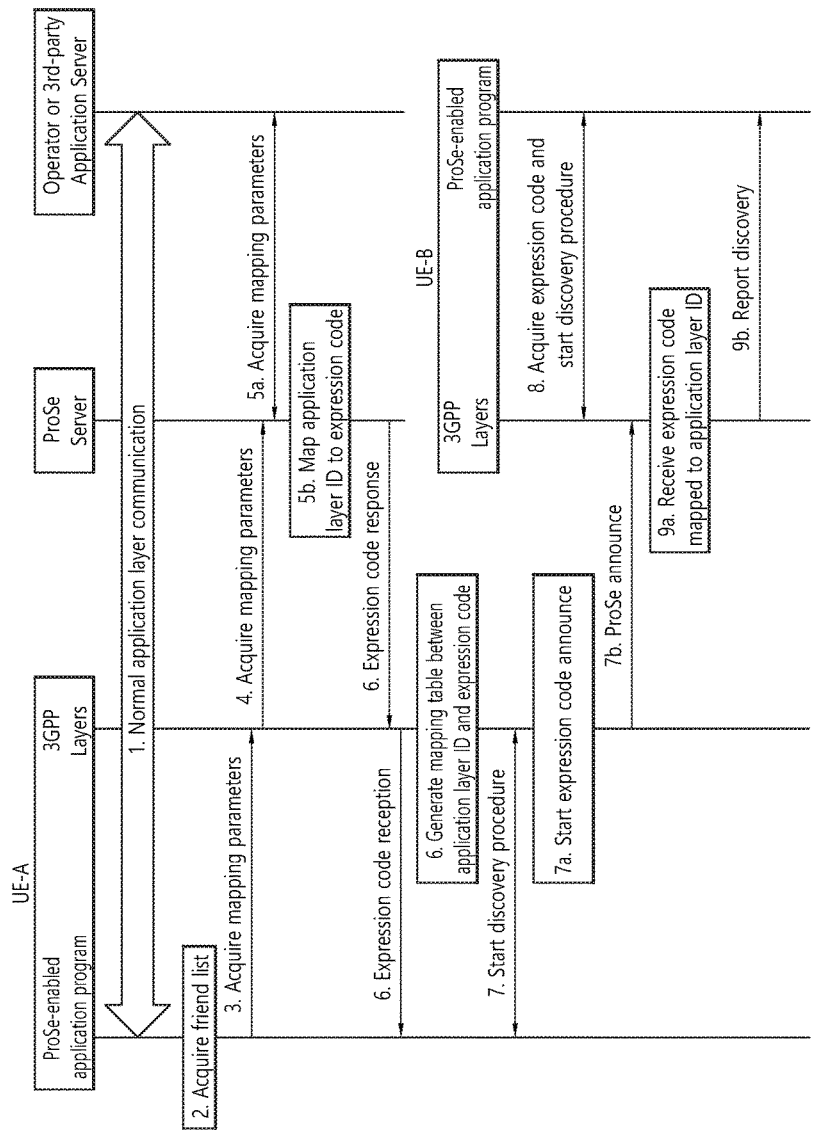
FIG. 13 illustrates an embodiment of a ProSe direct discovery procedure.

FIG. 13 illustrates an embodiment of a ProSe direct discovery procedure.

Referring to FIG. 13, it is assumed in a terminal A and a terminal B that a ProSe-enabled application program is operated, and the terminal A and the terminal B are configured in a friend relationship to each other, that is, a relationship capable of allowing D2D communication with each other in the application program. Hereinafter, the terminal B may be expressed as a friend of the terminal A. For example, the application program may be a social networking program. 3GPP Layers correspond to functions of an application program for using a ProSe discovery service regulated according to 3GPP.

A ProSe direct discovery between the terminal A and the terminal B may perform a following procedure.

1. First, the terminal A performs regular application-Layer communication with an application server. The above communication is performed based on Application programming interface (API).

2. A ProSe enabled application program of the terminal A receives a list of application layer IDs having a friend relationship. The application layer ID may generally be in the form of a network access ID. For example, an application layer ID of the terminal A may have a form such as adam@example.com.

3. A terminal A requests private expression codes for a user and private expression codes for a friend of the user.

4. 3GPP layers transmit an expression code request to a ProSe server.

5. The ProSe server map application layer IDs provided from an operator or a third application server to private expression codes. For example, an application layer ID such as adam@example.com. The mapping may be performed based on parameters (e.g., mapping algorithms, key values, and the like) received from an application service of the network.

6. The ProSe server responds the obtained expression codes to the 3GPP layers. The 3GPP layers report that expression codes with respect to the requested application layer are successively received to the ProSe enabled application program. Further, a mapping table between the application layer IDs and the expression codes are generated.

7. The ProSe enabled application program requests the 3GPP layers to start the discovery procedure. That is, when one of friends is located close to the terminal A and direct communication may be performed, the ProSe enabled application program attempts the discovery. 3GPP layers announce a private expression code of the terminal A (that is, "GTER543$#2FSJ67DFSF" which is a private expression code of adam@example.com in the above example). In mapping of an application layer ID of a corresponding application program and the private expression code, the mapping relationship may be known by the previously received friends, and the mapping may be performed.

8. It is assumed that the terminal B is operating the same ProSe enabled application program as that of the terminal A, and the above steps 3 to 6 may be executed. 3GPP layers included in the terminal B may perform ProSe discovery.

9. When the terminal B receives the above announce from the terminal A, the terminal B determines whether the private expression code included in the announce is known by the terminal B or is mapped to an application layer ID. As illustrated in step 8, since the terminal B performs steps 3 to 6, the terminal B knows a private expression code with respect to the terminal A, mapping of the private expression code to the application layer ID, and which is a corresponding application program. Accordingly, the terminal B may discover the terminal B from the announce of the terminal A. The 3GPP layers in the terminal B announces that adam@example.com is discovered to the ProSe enable application program.

FIG. 13 illustrates a discovery procedure by taking into consideration the terminals A and B, the ProSe server, and the application server. Only an operation side between the terminals A and B is described. The terminal A transmits a signal called the announce (the procedure may refer to announcement), and the terminal B receives the announce to discover the terminal A. That is, a discovery procedure of FIG. 13 in an operation directly related to another terminal among operations performed by each terminal may refer to a single step discovery procedure may refer to a single step discovery procedure in a side of one step.

Figure 14:
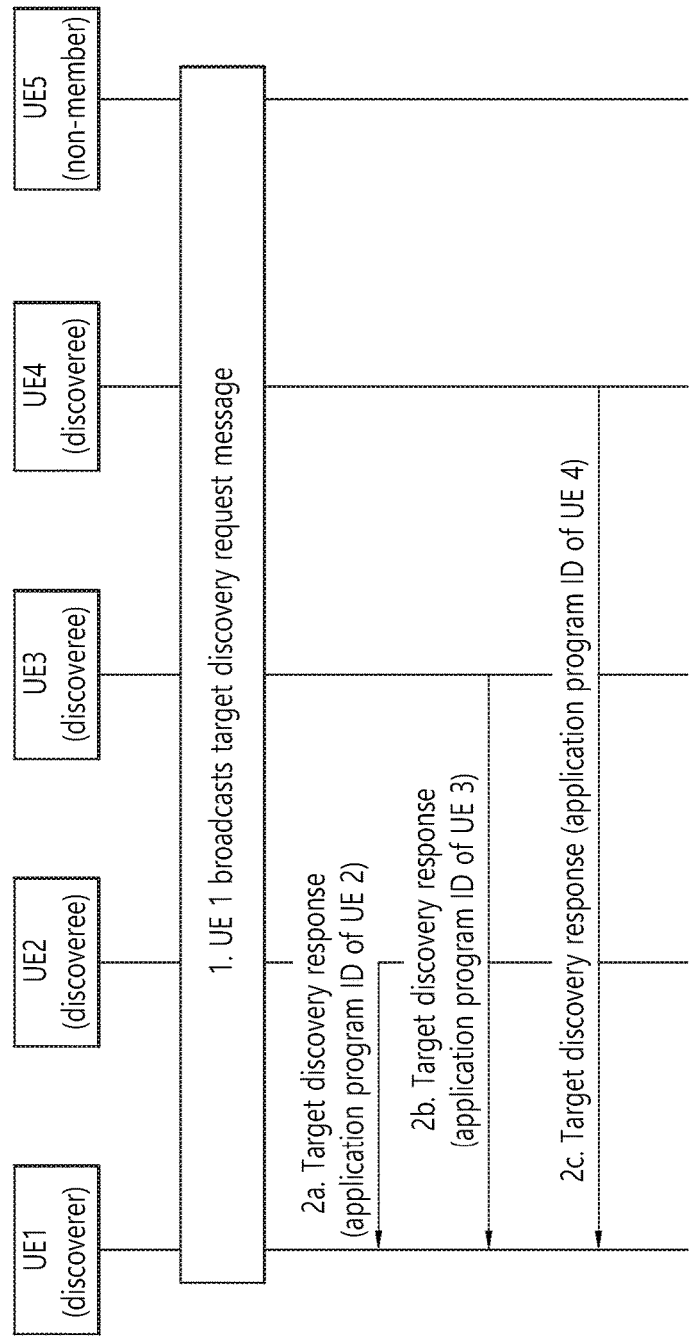
FIG. 14 illustrates another embodiment of a ProSe direct discovery procedure.

FIG. 14 illustrates another embodiment of a ProSe direct discovery procedure.

In FIG. 14, it is assumed that the terminal 1 to the terminal 4 may be included in a specific group communication system enablers (GCSE) group. It is assumed that the terminal 1 is a discoverer and terminals 2, 3, and 4 are a discoveree. A terminal 5 is a terminal regardless of a discovery procedure.

The terminal 1 and the terminals 2 to 4 may perform a following operation in a discovery procedure.

First, the terminal 1 broadcasts a targeted discovery request message (hereinafter referred to 'discovery request message' or 'M1') in order to discover whether an optional terminal included in the GCSE group is located around the terminal 1. The targeted discovery request message may include a unique application program group ID or a layer-2 group ID of the specific GCSE group. Further, the targeted discovery request message may include a unique ID of the terminal 1, that is, an application program private ID. The targeted discovery request message may be received by the terminals.

The terminal 5 transmits no response messages. The terminals 2, 3, and 4 included in the GCSE group transmit a targeted discovery response message (hereinafter referred to as a discovery response message or M2) as a response to the targeted discovery request message. The targeted discovery response message may include a unique application program private ID of a terminal transmitting the message.

An operation of terminals in a ProSe discovery procedure illustrated in FIG. 14 will be described. A discoverer (UE 1) transmits the targeted discovery request message, and receives a targeted discovery response message being a response thereto. In addition, if a discoveree (e.g., UE 2) receives the targeted discovery request message, the discoveree transmits a targeted discovery response message as a response thereto. Accordingly, each terminal performs an operation a second step. In the above side, a ProSe discovery procedure of FIG. 14 may refer to a discovery procedure.

In addition to the discovery procedure illustrated in FIG. 14, if the terminal 1 (discoverer) transmits a discovery confirm message (hereinafter may refer to M3) as a response to the targeted discovery response message, this may refer to a third step discovery procedure.

Hereinafter, the present invention is described.

Hereinafter, mode-1 transmission may be defined to mean that a D2D signal (control information and/or data on a D2D operation) is transmitted via a resource scheduled by a network. It is generally possible for the network to perform scheduling when a UE is in the RRC connected state. Mode-2 transmission may be defined to mean that a D2D signal is transmitted using a resource determined autonomously by a UE in a certain resource pool.

Figure 15:
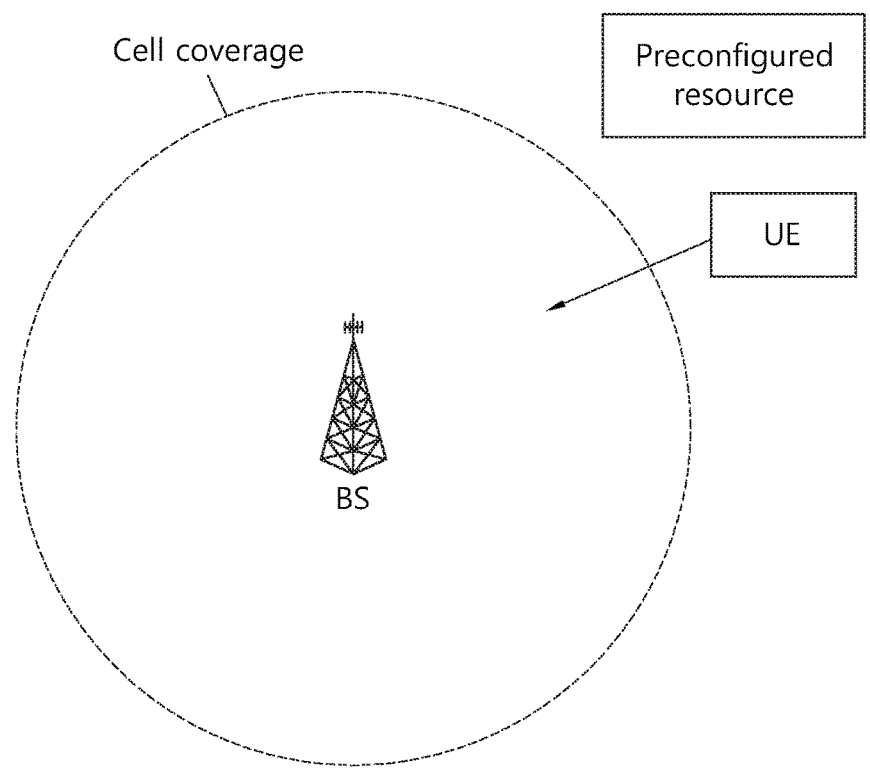
FIG. 15 illustrates a situation to which the present invention is applicable.

FIG. 15 illustrates a situation to which the present invention is applicable.

Referring to FIG. 15, a UE, which is located outside cell coverage, is moving into the cell coverage. A BS of a cell periodically broadcasts system information. The UE may perform a D2D operation using a resource called a preconfigured resource outside the cell coverage.

When the UE enters the cell coverage, the UE may acquire a mode-2 transmission resource from the system information provided by the BS of the cell. The mode-2 transmission resource may be provided in the form of a resource pool.

However, if the system information simply indicates the mode-2 transmission resource only, the UE may not know whether the mode-2 transmission resource is applied in the RRC idle state or is applied only in the RRC connected state.

Figure 16:
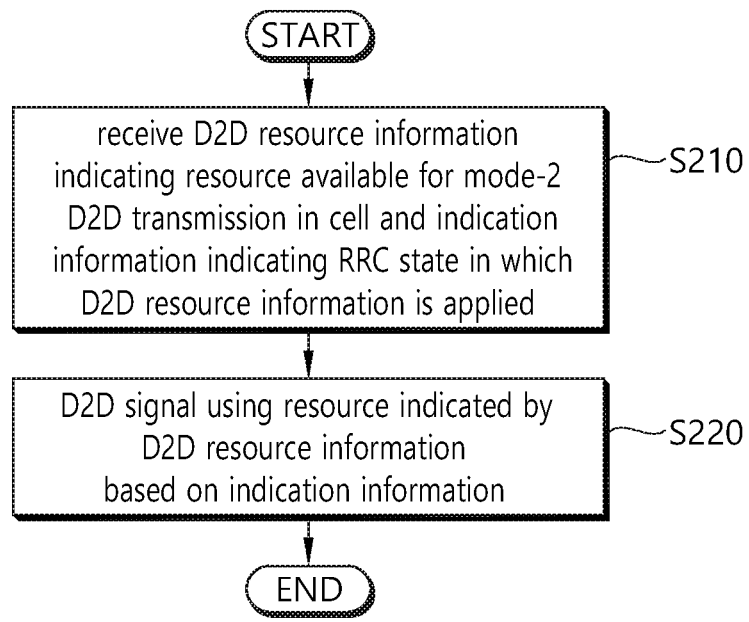
FIG. 16 illustrates a D2D operation of a UE according to one embodiment of the present invention.

FIG. 16 illustrates a D2D operation of a UE according to one embodiment of the present invention.

Referring to FIG. 16, the UE receives D2D resource information indicating a resource available for mode-2 D2D transmission (mode-2 transmission resource) in a cell and indication information indicating an RRC state in which the D2D resource information is applied (S210).

The UE transmits a D2D signal using the resource indicated by the D2D resource information (that is, mode-2 transmission resource) based on the indication information (S220).

Hereinafter, each operation of FIG. 16 is described in detail.

As described above, when only the mode-2 transmission resource is indicated, the UE may not know whether the mode-2 transmission resource is applied in the RRC idle state or is applied only in the RRC connected state. To solve such a problem, a network according to the present invention may provide the UE with the indication information indicating the RRC state in which the D2D resource information is applied. The UE may know based on the indication information in which RRC state the resource indicated by the D2D resource information is applied. That is, the UE may know through the indication information whether D2D resource information acquired in one RRC state (for example, the RRC idle state) is also applicable in another RRC state (for example, the RRC connected state).

Meanwhile, the indication information may be broadcast or be provided as a dedicated signal to a specific UE.

For example, when the network wants the UE to apply D2D resource information acquired in the RRC idle state even in the RRC connected state, the network may broadcast the indication information. When the indication information is broadcast, the UE may consider that the D2D resource information acquired in the RRC idle state is also applicable in the RRC connected state.

Alternatively, when the network wants the UE to apply D2D resource information acquired in the RRC connected state even in the RRC idle state, the network may provide the indication information through a dedicated signal. When the indication information is included in the dedicated signal, the UE may consider that the D2D resource information acquired in the RRC connected state is also applicable in the RRC idle state. The dedicated signal to the UE may be, for example, an RRC connection release message or RRC connection reconfiguration message.

The network may configure, through the indication information, a resource, which is allowed, known, or reserved for the UE to use in the transmission of a D2D discovery signal, 1) to be used in both the RRC idle state and the RRC connected state or 2) to be used only in the RRC connected state. If the network configures the resource, which is allowed/known/reserved for use in the transmission of the D2D discovery signal, not to be used by the UE in the RRC idle state through the indication information, the UE may consider that the transmission of the D2D discovery signal is not allowed in the RRC idle state but is allowed only in the RRC connected state, although knowing or reserving the transmission of the D2D discovery signal.

Further, the UE that is allowed to perform the transmission of the D2D discovery signal only in the RRC connected state through the indication information may consider that the transmission of the D2D discovery signal is allowed only when the network allocates a dedicated resource to the UE. That is, the UE does not consider that the D2D resource information acquired in the RRC idle state is applicable in the RRC connected state.

Meanwhile, suppose that the UE is allowed to use the resource for the transmission of the D2D discovery signal both in the RRC idle state and in the RRC connected state. Then, the UE may consider that the D2D resource information acquired in the RRC idle state (information indicating the resource for the transmission of the D2D discovery signal) is also applicable in the RRC connected state. That is, the UE may transmit the D2D discovery signal using the resource information acquired in the RRC idle state even in the RRC connected state.

The indication information may indicate that the D2D resource information acquired in the RRC connected state is also applicable even in the RRC idle state. In this case, the UE may transmit the D2D discovery signal using the D2D resource information acquired in the RRC connected state even in the RRC idle state.

Although the foregoing example illustrates the D2D discovery signal, the same method may also be applied to D2D communication, without being limited.

For example, when providing the D2D resource information indicating a mode-2 resource pool for D2D communication through system information, the network may also transmit indication information indicating whether the mode-2 resources in the system information are used in the RRC idle state or in the RRC connected state.

The indication information may indicate an RRC state in which the D2D resource information is applied, thereby configuring an operation of the UE. For example, the indication information may indicate that a mode-2 resource indicated by the D2D resource information is not available in the RRC idle state but is available in the RRC connected state only in a predetermined case (exceptional case). Even though the UE is configured to operate in mode 1, the UE may be allowed to operate in mode 2 in the exceptional case.

Here, the indication information is provided only for illustrative purposes to implement the present invention, and an implementation method thereof is not limited thereto.

Meanwhile, when the D2D resource information indicates a mode-2 resource used for D2D communication, the indication information may also be broadcast or be provided as a dedicated signal to a specific UE.

For example, when the network wants the UE to apply D2D resource information acquired in the RRC connected state even in the RRC idle state, the network may provide the indication information through a dedicated signal. When the indication information is included in the dedicated signal, the UE may consider that the D2D resource information acquired in the RRC connected state is also applicable in the RRC idle state. The dedicated signal to the UE may be, for example, an RRC connection release message or RRC connection reconfiguration message.

Meanwhile, the network may restrict the validity of the indication information. That is, the network may transmit the indication information, setting a time period in which the indication information is valid. This validity period may start from the time when the UE leaves the RRC connected state after receiving the indication information or the time when the UE receives the indication information.

When the validity period expires, the UE may consider that mode-2 transmission using the mode-2 resource pool included in the system information is not allowed in the RRC idle state or may consider that mode-2 transmission using the mode-2 resource pool included in the system information is not allowed in any RRC state.

When changing a cell, the UE may discard the indication information. That is, the UE may consider that a timer indicating the validity period expires. Alternatively, the UE may keep the timer operating to expiry until a new indicator is received from a new cell.

A fallback condition in which a UE autonomously performs operation switching of autonomously selecting a resource to perform D2D transmission in D2D transmission scheduled by the network may be defined. That is, when the UE is subject to the fallback condition, the UE may perform mode/operation switching from a first mode operation (for example, a D2D transmission mode of being scheduled by the network) to a second mode operation (for example, a mode in which the UE autonomously selects a resource to perform a D2D operation).

The fallback condition may be, for example, a radio link failure (RLF) or a different radio connection problem experienced by the UE in the RRC connected state.

When the UE is subject to the fallback condition while performing the mode-1 operation, the UE may be allowed to perform operation switching from mode 1 to mode 2. That is, it may be considered that the UE is temporarily allowed to perform mode-2 transmission even though configured in mode 1.

A fallback condition in which a UE performs D2D transmission by autonomously selecting a resource from a resource pool available in a normal state and performs D2D transmission using a resource pool available in an exceptional situation may be defined.

The fallback condition may be, for example, a case in which a UE makes an attempt at RRC connection to a cell but fails to establish RRC connection N times successively.

The following tables illustrate UE operations relating to indication information.

First, when mode-2 transmission resources are provided via system information without indication information, a UE may operate as follows.

TABLE 2

| RRC state of UE | Operation of UE |
| --- | --- |
| RRC idle state | Mode-2 transmission allowed |
| RRC connected state | Normal mode-2 transmission allowed in normal state |
| RRC connected state | Fallback mode-2 transmission allowed when subject to fallback condition |

Referring to Table 2, when a UE is in the RRC idle state and system information provides mode-2 transmission resources, the UE may consider that the UE is allowed to perform mode-2 transmission and may perform mode-2 transmission using a mode-2 transmission resources provided by the system information.

When a UE is in the RRC connected state and system information provides mode-2 transmission resources, the UE may consider that the UE is allowed to perform mode-2 transmission when subject to the foregoing fallback condition and may perform mode-2 transmission using a mode-2 transmission resources provided by the system information.

When there is no indication information and mode-2 transmission resources broadcast by system information are divided into i) a resource available in a normal state and ii) a resource available in a fallback condition, a UE may operate as follows.

TABLE 3

| RRC state of UE | Operation of UE |
| --- | --- |
| RRC idle state | Mode-2 transmission allowed |
| RRC connected state | Normal mode-2 transmission allowed using normal mode-2 resource in normal state |
| RRC connected state | Mode-2 transmission allowed using fallback mode-2 resource when subject to fallback condition |

When there is indication information and mode-2 transmission resources are provided via system information without indication information, a UE may operate as follows.

TABLE 4-1

| RRC state of UE | Indication information | Operation of UE |
| --- | --- | --- |
| RRC idle state | To perform mode-2 operation in RRC connected state | Mode-2 transmission not allowed |
| | To perform mode-2 operation in RRC idle state | Mode-2 transmission allowed |
| | To perform mode-2 operation in RRC idle state and in RRC connected state | Mode-2 transmission allowed |
| RRC connected state | To perform mode-2 operation in RRC connected state | Normal mode-2 transmission allowed using normal mode-2 resource in normal state Mode-2 transmission allowed using fallback mode-2 resource when subject to fallback condition |
| | To perform mode-2 operation in RRC idle state | Mode-2 transmission not allowed |
| | To perform mode-2 operation in RRC idle state and in RRC connected state | Normal mode-2 transmission allowed using normal mode-2 resource in normal state Mode-2 transmission allowed using fallback mode-2 resource when subject to fallback condition |

According to Table 4-1, when a UE is in the RRC idle state and system information provides mode-2 transmission resources, indication information indicating that a mode-2 operation is possible in the RRC connected state, the UE in the RRC idle state is not currently allowed to perform mode-2 transmission.

TABLE 4-2

| RRC state of UE | Indication information | Operation of UE |
|---|---|---|
| RRC idle state | To perform mode-2 operation in RRC connected state | Mode-2 transmission not allowed Mode-2 transmission allowed using fallback mode-2 resource when subject to fallback condition |
| | To perform mode-2 operation in RRC idle state | Mode-2 transmission allowed |
| | To perform mode-2 operation in RRC idle state and in RRC connected state | Mode-2 transmission allowed |
| RRC connected state | To perform mode-2 operation in RRC connected state | Normal mode-2 transmission allowed using normal mode-2 resource in normal state Mode-2 transmission allowed using fallback mode-2 resource when subject to fallback condition |
| | To perform mode-2 operation in RRC idle state | Mode-2 transmission not allowed Mode-2 transmission allowed using fallback mode-2 resource when subject to fallback condition |
| | To perform mode-2 operation in RRC idle state and in RRC connected state | Normal mode-2 transmission allowed using normal mode-2 resource in normal state Mode-2 transmission allowed using fallback mode-2 resource when subject to fallback condition |

According to Table 4-2, when a UE is in the RRC idle state and system information provides mode-2 transmission resources, indication information indicating that a mode-2 operation is possible in the RRC connected state, the UE is not allowed to perform mode-2 transmission except for fallback transmission.

Mode-2 transmission allowed in Tables 4-1 and 4-2 means that mode-2 transmission using a resource pool provided through system information is allowed and does not mean that mode-2 transmission using a predetermined resource pool is allowed.

As illustrated in Table 4-2, fallback-mode transmission may be applied in an exceptional situation regardless of the indication information. Alternatively, it is possible to signal a separate indicator indicating whether a fallback-mode operation is allowed only in an RRC state indicated by the indication information. Alternatively, an RRC state in which a fallback-mode operation is allowed may be separately indicated. In determining an RRC state in which a fallback-mode operation is allowed, it is possible that a UE determines whether the UE is subject to the fallback condition further considering the separate indicator.

Meanwhile, to determine whether a UE is allowed to perform mode-2 transmission or to control when a UE is allowed to perform mode-2 transmission if allowed, the network may additionally provide a reference signal received power (RSRP) threshold value. The network may set the RSRP threshold value according to the measurement of the RSRP of a serving cell performed by a UE.

When the RSRP of a cell for a D2D operation is higher than the RSRP threshold value, mode-2 transmission may be prohibited. A high RSRP of a cell may mean that the state of a channel between a UE and a BS is highly likely to be good and the UE and the BS are highly likely to be geographically close. Therefore, the mode-2 transmission of a UE may cause strong interference in the cell.

When a RSRP threshold is optionally provided by the network in addition indication information, a UE may operate as in the following table in view of the above two types of information.

TABLE 5

| RRC state of UE | RSRP threshold value | Indication information | Operation of UE |
|---|---|---|---|
| RRC idle state | Provided | To perform mode-2 operation in RRC connected state | Mode-2 transmission not allowed |
| | Provided | To perform mode-2 operation in RRC idle state | Mode-2 transmission allowed when RSRP of cell is higher than RSRP threshold value |
| | Not provided | To perform mode-2 operation in RRC connected state | Mode-2 transmission not allowed |
| | Not provided | To perform mode-2 operation in RRC idle state | Mode-2 transmission allowed |
| | Provided | To perform mode-2 operation in RRC idle state and in RRC connected state | Mode-2 transmission allowed when RSRP of cell is higher than RSRP threshold value |
| | Not provided | To perform mode-2 operation in RRC idle state and in RRC connected state | Mode-2 transmission allowed |
| RRC connected state | Provided | To perform mode-2 operation in RRC connected state | Mode-2 transmission allowed when subject to fallback condition due to RSRP of cell smaller than RSRP threshold value and thus |
| | Provided | To perform mode-2 operation in RRC idle state | Mode-2 transmission not allowed |
| | Not provided | To perform mode-2 operation in RRC connected state | Mode-2 transmission allowed when subject to fallback condition |
| | Not provided | To perform mode-2 operation in RRC idle state | Mode-2 transmission not allowed |
| | Provided | To perform mode-2 operation in RRC idle state and in RRC connected state | Mode-2 transmission allowed when RSRP of cell is higher than RSRP threshold value |
| | Not provided | To perform mode-2 operation in RRC idle state and in RRC connected state | Mode-2 transmission allowed when subject to fallback condition |

Mode-2 transmission allowed in the above table means that mode-2 transmission using a resource pool provided through system information is allowed, that is, does not mean that mode-2 transmission using a predetermined resource pool is allowed.

Meanwhile, the network may indicate whether a preconfigured resource, that is, a preconfigured resource for mode-2 transmission, is available in cell coverage. That is, the network may provide a UE with an indicator configuring/indicating whether mode-2 transmission using the preconfigured resource is allowed in the cell coverage.

When there is no indicator, the UE may consider that mode-2 transmission using the preconfigured resource is allowed in the cell coverage. Alternatively, the UE may consider that mode-2 transmission using the preconfigured resource is not allowed in the cell coverage.

The indicator may indicate an RRC state in which the preconfigured resource is available.

When the network provides no information indicating a resource pool for mode-2 transmission via system information, the indicator may be used. Although providing no information indicating a resource pool for mode-2 transmission through system information, the network may need to control whether to allow the UE to transmit a D2D signal using a preconfigured resource in the cell. In this case, the indicator may be used.

Figure 17:
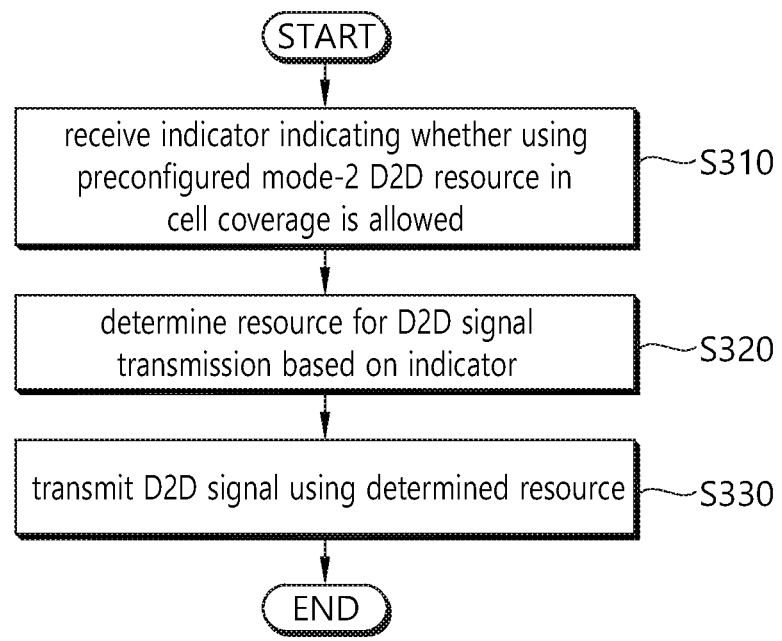
FIG. 17 illustrates a D2D operation method of a UE according to another embodiment of the present invention.

FIG. 17 illustrates a D2D operation method of a UE according to another embodiment of the present invention.

Referring to FIG. 17, the UE receives an indicator indicating whether using a preconfigured D2D resource in cell coverage is allowed (S310). The preconfigured D2D resource may be a D2D resource used outside the cell coverage. The indicator may be received through system information.

The UE determines a resource for D2D signal transmission based on the indicator (S320).

The UE transmits a D2D signal using the determined resource (S330).

Meanwhile, the indicator may further indicate the RRC state of the UE allowed to use the preconfigured D2D resource. The RRC state of the UE may be at least one of the RRC idle (RRC_Idle) state and the RRC connected (RRC_Connected) state.

The UE may further receive an RSRP threshold value from a network. The UE may determine the resource for D2D signal transmission based on the RSRP threshold value and the indicator.

The UE may operate as follows according to the indicator.

TABLE 6

| RRC state of UE | Indicator | Operation of UE |
| --- | --- | --- |
| RRC idle state | Not allowed or to perform mode-2 operation in RRC connected state | Mode-2 transmission using preconfigured resource not allowed |
| | To perform mode operation in RRC idle state | Mode-2 transmission using preconfigured resource allowed when subject to fallback condition |
| | To perform mode-2 operation in RRC idle state and in RRC connected state | Mode-2 transmission using preconfigured resource allowed |
| RRC connected state | Not allowed | Mode-2 transmission using preconfigured resource not allowed |
| | To perform mode operation in RRC idle state | Mode-2 transmission using preconfigured resource not allowed |
| | To perform mode-2 operation in RRC connected state | Mode-2 transmission using preconfigured resource allowed when subject to fallback condition |
| | To perform mode-2 operation in RRC idle state and in RRC connected state | Mode-2 transmission using preconfigured resource allowed when subject to fallback condition |

Referring to Table 6d, a UE in the RRC connected state is allowed to use a preconfigured resource only when subject to a fallback condition.

The network may additionally provides an RSRP threshold value to control the time for the UE to perform mode-2 transmission and whether to allow the UE to perform mode-2 transmission. The RSRP threshold value may vary depending on the RSRP value of a serving cell measured by the UE.

The UE may operate as follows in view of both the RSRP threshold value and the indicator.

TABLE 7

| RRC state of UE | RSRP threshold value | Indicator | Operation of UE |
| --- | --- | --- | --- |
| RRC idle state | Provided | Not allowed or to perform mode-2 operation in RRC connected state | Mode-2 transmission using preconfigured resource not allowed |
| | Provided | To perform mode-2 operation in RRC idle state | Mode-2 transmission allowed when RSRP of cell is higher than RSRP threshold value and subject to fallback condition |
| | Not provided | Not allowed or to perform mode-2 operation in RRC connected state | Mode-2 transmission using preconfigured resource not allowed |
| | Not provided | To perform mode-2 operation in RRC idle state | Mode-2 transmission allowed when subject to fallback condition |
| | Provided | To perform mode-2 operation in RRC connected state and in RRC idle state | Mode-2 transmission using preconfigured resource allowed when RSRP of cell is higher than RSRP threshold value |
| | Not provided | To perform mode-2 operation in RRC connected state and in RRC idle state | Mode-2 transmission using preconfigured resource allowed |
| RRC connected state | Don't care | Not allowed | Mode-2 transmission using preconfigured resource not allowed |
| | Provided | To perform mode-2 operation in RRC connected state | Mode-2 transmission using preconfigured resource not allowed when RSRP of cell is higher than RSRP threshold value and subject to fallback condition |
| | Provided | To perform mode-2 operation in RRC idle state | Mode-2 transmission not allowed |
| | Not provided | To perform mode-2 operation in RRC connected state | Mode-2 transmission using preconfigured resource allowed when subject to fallback condition |
| | Not provided | To perform mode-2 operation in RRC idle state | Mode-2 transmission not allowed |
| | Provided | To perform mode-2 operation in RRC connected state and in RRC idle state | Mode-2 D2D transmission using preconfigured resource allowed when RSRP of cell is higher than RSRP threshold value |
| | Not provided | To perform mode-2 operation in RRC connected state and in RRC idle state | Mode-2 transmission using preconfigured resource allowed when subject to fallback condition |

Referring to Table 7, a UE in the RRC connected state is allowed to mode-2 transmission using a preconfigured resource in cell coverage only when further being subject to a fallback condition or satisfying an RSRP threshold value. That is, the UE in the RRC connected state within the cell coverage is allowed to perform mode-2 transmission using a preconfigured resource only in limited cases.

Figure 18:
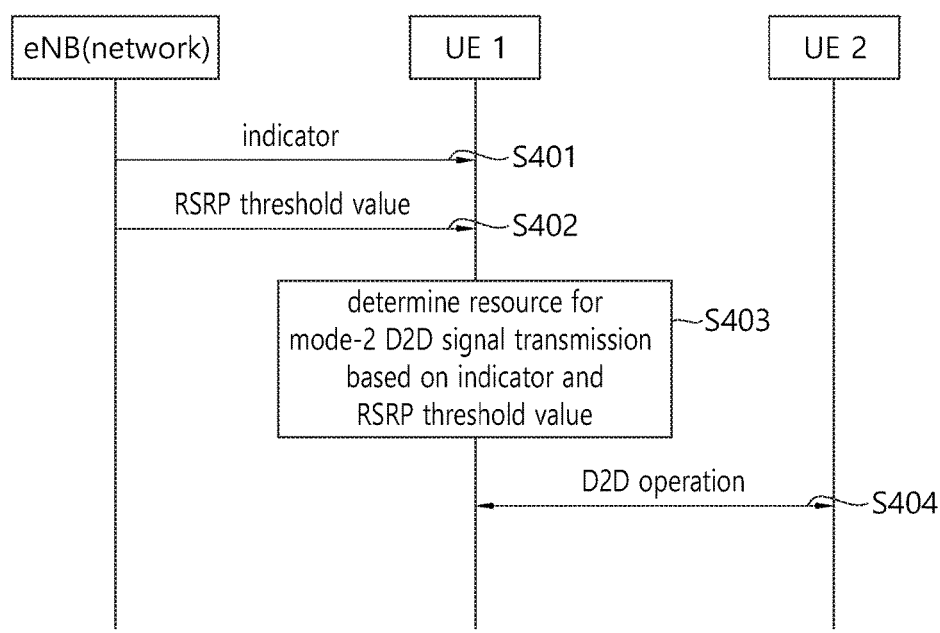
FIG. 18 illustrates a D2D operation of a UE according to the method of FIG. 17.

FIG. 18 illustrates a D2D operation of a UE according to the method of FIG. 17. Suppose that the UE, which is located outside cell coverage, is moving into the cell coverage.

Referring to FIG. 18, UE 1 receives an indicator from a network (S401) and receives an RSRP threshold value (S402). The indicator may indicate whether it is allowed to use a preconfigured D2D resource in the cell coverage and may indicate an RRC state in which the preconfigured D2D resource can be used. The RSRP threshold value functions to subdivide a condition for which UE 1 uses the preconfigured D2D resource in the cell coverage.

UE 1 determines a resource for mode-2 D2D signal transmission based on the indicator and the RSRP threshold value (S403). This process may be referred to Tables 5 and 6. UE 1 performs a D2D operation with UE 2 using the determined resource (S404).

Figure 19:
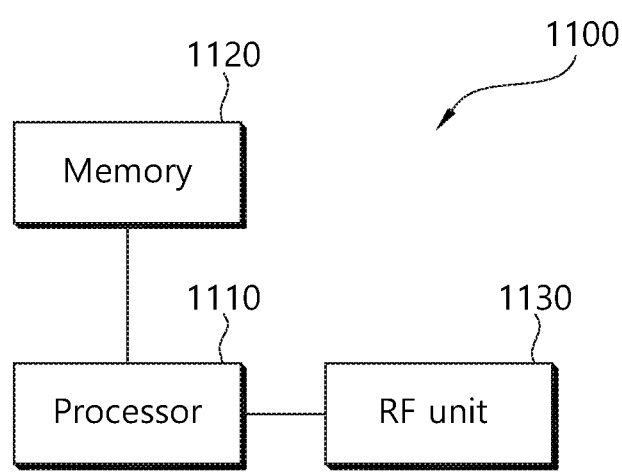
FIG. 19 is a block diagram of a UE according to an embodiment of the present invention.

FIG. 19 is a block diagram of a UE according to an embodiment of the present invention.

Referring to FIG. 19, the UE 1100 includes a processor 1110, a memory 1120, and a radio frequency (RF) unit 1130. The processor 1110 implements the proposed functions, processes, and/or methods. For example, the processor 1110 may receive an indicator indicating whether it is allowed to use a preconfigured D2D resource in cell coverage, may determine a resource for D2D signal transmission based on the indicator, and may transmit a D2D signal using the determined resource.

The RF unit 1130 is coupled to the processor 1110 and transmits and receives a radio signal.

The processor may include Application-specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the embodiments are implemented in software, the above-described scheme may be implemented using a module (process or function) which performs the above function. The module may be stored in the memory and executed by the processor. The memory may be disposed to the processor internally or externally and connected to the processor using a variety of well-known means.

What is claimed is:

1. A method for performing device-to-device (D2D) communication in a wireless communication system, the method performed by a user equipment (UE) in network coverage and comprising:
    receiving resource information for a D2D resource and specific information;
    performing the D2D communication on the D2D resource based on the resource information and the specific information,
    wherein the UE determines whether the D2D resource information acquired in one radio resource control (RRC) state is also applicable in another RRC state based on whether the specific information is broadcasted or not,
    wherein the RRC state is a RRC idle state or a RRC connected state;
    when the specific information is broadcasted, determining that the D2D resource information acquired in the RRC idle state is also applicable in the RRC connected state; and
    when the specific information is not broadcasted but is provided based on 4a UE dedicated signal, determining that the D2D resource information acquired in the RRC connected state is also applicable in the RRC idle state, the UE dedicated signal being a RRC connection release message or a RRC connection reconfiguration message.

2. A user equipment (UE) in network coverage for performing device-to-device (D2D) communication in a wireless communication system, the UE comprising:
    a radio frequency (RF) transceiver that transmits and receives a radio signal; and
    a processor connected to the RF transceiver and that:
    controls the RF transceiver to receive resource information for a D2D resource and specific information;
    performs the D2D communication on the D2D resource based on the resource information and the specific information,
    wherein the UE determines whether the D2D resource information acquired in one radio resource control (RRC) state is also applicable in another RRC state based on whether the specific information is broadcasted or not,
    wherein the RRC state is a RRC idle state or a RRC connected state;
    when the specific information is broadcasted, determine that the D2D resource information acquired in the RRC idle state is also applicable in the RRC connected state; and
    when the specific information is not broadcasted but is provided based on a UE dedicated signal, determine that the D2D resource information acquired in the RRC connected state is also applicable in the RRC idle state, the UE dedicated signal being a RRC connection release message or a RRC connection reconfiguration message.

3. The method of claim 1, further comprising:
    in a mode 1 operation, performing the D2D communication based on a mode 1 resource scheduled by a network, and
    in a mode 2 operation, acquiring a mode 2 resource from among a preconfigured resource set and performing the D2D communication based on the acquired mode 2 resource.

4. The UE of claim 2, wherein the processor is further configured to:
    in a mode 1 operation, perform the D2D communication based on a mode 1 resource scheduled by a network, and
    in a mode 2 operation, acquire a mode 2 resource from among a preconfigured resource set and perform the D2D communication based on the acquired mode 2 resource.

* * * * *